US005512180A

United States Patent [19]

Ho

[11] Patent Number: 5,512,180
[45] Date of Patent: Apr. 30, 1996

[54] EXTRACTING ORGANIC COMPOUNDS FROM AQUEOUS SOLUTIONS

[75] Inventor: Sa V. Ho, St. Louis, Mo.

[73] Assignee: Monsanto Company, St. Louis, Mo.

[21] Appl. No.: 341,345

[22] Filed: Nov. 17, 1994

Related U.S. Application Data

[63] Continuation of Ser. No. 5,470, Feb. 3, 1993, abandoned, which is a continuation-in-part of Ser. No. 854,180, Mar. 20, 1992, abandoned.

[51] Int. Cl.$^6$ .................................................. B01D 69/10
[52] U.S. Cl. ....................... 210/643; 210/440; 210/500.36
[58] Field of Search ..................................... 210/634, 640, 210/653, 490, 643, 500.36; 95/44, 50; 96/10

[56] References Cited

U.S. PATENT DOCUMENTS

| | | | |
|---|---|---|---|
| 3,410,794 | 3/1966 | Li ........................................... | 210/643 |
| 3,801,404 | 4/1974 | Druin et al. ........................... | 156/229 |
| 3,816,524 | 6/1974 | Grinstead . | |
| 3,819,806 | 6/1974 | Ward, III et al. ..................... | 423/220 |
| 3,839,516 | 6/1974 | Williams et al. ...................... | 264/171 |
| 3,843,761 | 10/1974 | Bierenbaum et al. ................ | 264/154 |
| 3,959,173 | 5/1976 | Li et al. ................................. | 210/643 |
| 3,969,265 | 7/1976 | Singhal et al. ........................ | 210/643 |
| 4,001,147 | 1/1977 | Chamberlin et al. ................. | 525/375 |
| 4,011,160 | 3/1977 | Chamberlin et al. ................. | 210/692 |
| 4,014,785 | 3/1977 | Li et al. ................................. | 210/643 |
| 4,055,696 | 10/1977 | Kamada et al. ....................... | 264/209.5 |
| 4,066,505 | 1/1978 | Schneider . | |
| 4,086,163 | 4/1978 | Cahn et al. ............................ | 210/638 |
| 4,089,653 | 5/1978 | Ward, III .............................. | 423/232 |
| 4,089,778 | 5/1978 | Gauger .................................. | 210/638 |
| 4,119,408 | 10/1978 | Matson .................................. | 423/232 |
| 4,147,754 | 4/1979 | Ward, III .............................. | 423/224 |
| 4,174,374 | 11/1979 | Matson .................................. | 423/232 |
| 4,237,237 | 12/1980 | Jarre et al. ............................ | 210/692 |
| 4,244,816 | 1/1981 | Vogler et al. .......................... | 210/638 |
| 4,255,376 | 3/1981 | Soehngen .............................. | 264/154 |
| 4,257,997 | 3/1981 | Soehngen et al. .................... | 264/154 |
| 4,276,179 | 6/1981 | Soehngen .............................. | 210/679 |
| 4,278,548 | 7/1981 | Bettinger et al. ..................... | 210/639 |
| 4,292,181 | 9/1981 | Li et al. ................................. | 210/638 |
| 4,303,531 | 12/1981 | Kawabata et al. .................... | 210/663 |
| 4,337,154 | 6/1982 | Fukuchi et al. ....................... | 210/490 |
| 4,360,448 | 11/1982 | Li et al. ................................. | 210/643 |
| 4,405,688 | 9/1983 | Lowery et al. ....................... | 210/500.23 |
| 4,437,994 | 3/1984 | Baker .................................... | 210/638 |
| 4,459,326 | 7/1984 | Colombo et al. ..................... | 427/140 |
| 4,544,779 | 10/1985 | Bright . | |
| 4,575,568 | 3/1986 | Yuhas, Jr. et al. .................... | 568/750 |
| 4,705,544 | 11/1987 | Okita et al. ........................... | 540/465 |
| 4,710,205 | 12/1987 | Deetz et al. ........................... | 55/158 |
| 4,734,112 | 3/1988 | Okita et al. ........................... | 210/638 |
| 4,747,949 | 5/1988 | Barkey .................................. | 210/638 |
| 4,762,899 | 8/1988 | Shikhami ............................... | 528/49 |
| 4,780,114 | 10/1988 | Quinn et al. .......................... | 423/210.5 |
| 4,789,468 | 12/1988 | Sirkar et al. .......................... | 210/137 |
| 4,802,987 | 2/1989 | Black .................................... | 210/653 |
| 4,808,313 | 2/1989 | Michizuki et al. ................... | 210/500.28 |
| 4,824,443 | 4/1989 | Matson et al. . | |
| 4,851,124 | 7/1989 | Vandegrift et al. . | |
| 4,886,598 | 12/1989 | Barkey .................................. | 210/506 |
| 4,935,144 | 6/1990 | Pasternak et al. .................... | 210/640 |
| 4,944,881 | 7/1990 | Michizuki et al. ................... | 210/640 |
| 4,948,511 | 8/1990 | Swanson et al. ..................... | 210/634 |
| 4,961,758 | 10/1990 | Dobitz .................................. | 585/818 |
| 4,966,707 | 10/1990 | Cussler et al. ........................ | 210/632 |
| 4,968,430 | 11/1990 | Hildenbrand et al. ............... | 210/640 |
| 4,973,434 | 11/1990 | Sirkar et al. .......................... | 428/398 |
| 4,973,606 | 11/1990 | Sterzel et al. ........................ | 524/204 |
| 4,973,775 | 11/1990 | Sugier et al. . | |
| 4,985,147 | 1/1991 | Mochizuki et al. ................. | 210/500.27 |
| 4,988,443 | 1/1991 | Michaels et al. .................... | 210/631 |
| 4,997,569 | 3/1991 | Sirkar .................................... | 210/637 |
| 5,015,560 | 5/1991 | Koboshi et al. ..................... | 210/692 |
| 5,028,339 | 7/1991 | Clark, III .............................. | 210/692 |
| 5,030,671 | 7/1991 | Hann et al. ........................... | 528/171 |
| 5,043,073 | 8/1991 | Brunner et al. . | |
| 5,049,275 | 9/1991 | Gillberg-LaForce et al. ...... | 210/500.27 |
| 5,153,355 | 10/1992 | Mildenberger et al. . | |
| 5,179,190 | 1/1993 | Regen .................................... | 528/272 |
| B1 4,303,531 | 8/1988 | Kawabata et al. ................... | 210/663 |

FOREIGN PATENT DOCUMENTS

| | | |
|---|---|---|
| 1058525 | 7/1979 | Canada . |
| 0245857A1 | 5/1987 | European Pat. Off. . |
| 0297252A2 | 5/1988 | European Pat. Off. . |
| 0296098 | 6/1988 | European Pat. Off. . |
| 0336241A2 | 3/1989 | European Pat. Off. . |
| 0561759A1 | 3/1993 | European Pat. Off. . |
| 93870053 | 3/1993 | European Pat. Off. . |
| 85/31857 | 12/1985 | United Kingdom . |
| 2169301A | 7/1986 | United Kingdom . |
| WO90/06168 | 6/1990 | WIPO . |

OTHER PUBLICATIONS

J. of Membrane Science, 36 (1988) 331–342 W. Gudernatsch et al, Recovery and Concentration of High Vapour Pressure Bioproducts by Means of Controlled Membrane Separation.

K. B. Hvid, P. S. Nielsen and F. F. Stengaard, "Preparation and Characterization of a New Ultrafiltration Membrane", Nov. 15, 1989–Revised Mar. 29, 1990; pp. 189–202.

Fox, Chester R., "Remove and Recover Phenol," Hydrocarbon Processing, pp. 109–111 (1975).

Tsuchida et al., "Adsorption of Phenols on Polymers in Aqueous Solution," European Polymer Journal, vol. 13, pp. 269–272, (1977).

Jendrychowska–Bonamour et al., "Greffage Radiochimique De L'Acrylonitrile Sur le Polystyrene–1," European Polymer Journal, vol. 13, p. 241, (1977).

(List continued on next page.)

*Primary Examiner*—Frank Spear
*Attorney, Agent, or Firm*—Kenneth D. Goetz

[57] ABSTRACT

A process for removing dissolved organic compounds from an aqueous solution wherein said solution is contacted with a water insoluble, liquid oligomeric or polymeric poly(amphiphilic) compound having an affinity for said organic compound.

31 Claims, No Drawings

OTHER PUBLICATIONS

Klementson et al., "Ultrafiltration and Hyperfiltration of Phenolic Compounds in Coal Gasification Wastewater Streams", Prog. Wat. Tech., vol. 10, pp. 479–491, (1978).

Fox, Chester R., "Plant Uses Prove Phenol Recovery With Resins," Hydrocarbon Processing pp. 269–273 (1978).

Fox, C. R., "Removing Toxic Organics From Waste Water," CEP (1979).

Krishnakumar et al., "A Novel Method of Recovering Phenolic Substances From Aqueous Alkaline Waste Streams," Ind. Eng. Chem. Process Des. Dev., pp. 410–413 (1984).

Danesi et al., "Lifetime of Supported Liquid Membrane: . . . ," Journal of Membrane Science, pp. 117–145 (1987).

Noble et al., "Facilitated Transport Membrane Systems," Chem. Eng. Prog. pp. 58–70 (1989).

Deblay et al., "Selection of Organic Phases for Optimal Stability and Efficiency of Flat–Sheet Supported Liquid Membranes, Sep. Sci. and Tech.," pp. 97–116 (1991).

6036, Journal of Membrance Science, 53(1990) Nov. 1, No. 3, Amsterdam, NL, "Preparation and Charcterization of a New Ultrafiltration Membrane," pp. 190–202.

European Search Report EP 93 87 0167 dated 2 Sep. 1994, The Hague.

EXTRACTING ORGANIC COMPOUNDS FROM AQUEOUS SOLUTIONS

This is a continuation of U.S. application Ser. No. 08/005,470 filed Feb. 3, 1993 now abandoned, which is a continuation-in-part of U.S. application Ser. No. 07/854,180 filed Mar. 20, 1992 now abandoned.

BACKGROUND OF THE INVENTION

1. Field of the Invention

The present invention is directed to a process for removing, i.e., extracting, a dissolved organic specie or species (solute or target compounds which may be in liquid and/or gaseous form), particularly polar organic compounds, from a gaseous stream or an aqueous solution. This invention particularly relates to a process which uses water insoluble, or at least sparingly water soluble oligomeric or polymeric poly(amphiphilic) compounds, especially poly(oxy) compounds, to remove organic compounds, particularly polar organic compounds, from either gaseous stream or aqueous solutions by contacting said gaseous stream or aqueous solution with said oligomeric or polymeric poly(amphiphilic) compound.

2. Description of Related Art

Liquid-liquid extraction is a common process for transferring a solute dissolved in a first liquid (called the feed solution) into a second liquid (called the extractant) which is essentially immiscible with the first liquid. The dissolved solute might be either a solid, liquid or gas. Upon contacting of the feed solution with the extractant, the solute partitions itself between both liquid phases in accordance with the relative solubility of the solute in the respective liquids. Thereafter, the two immiscible phases are separated from one another, thus obtaining a separation of a fraction of the solute from the feed solution.

In common practice, to promote a rapid distribution of the solute between the two liquids, such extractions are carried out by intimately mixing the feed solution and the extractant. In an alternative approach, a porous membrane acts as a partition or barrier between the two immiscible liquids to define their interface. Solute is transported between the two liquids through the pores of the membrane.

Regardless of the method of contacting employed, the degree of separation of solute from the feed solution depends upon how the solute partitions itself between the two immiscible phases. The ratio of the concentration of solute in the extractant to the concentration of solute remaining in the feed solution under equilibrium conditions is called the partition coefficient. The prior art is continuously searching for more efficient extractant, i.e., extractant with higher partition coefficients, for removing particular solutes from feed solutions.

DESCRIPTION OF THE INVENTION

The present invention is directed to a process for selectively removing dissolved organic compounds, and especially polar organic compounds such as alcohols, organic phenolic compounds like phenol, nitrophenol and nitroaniline, organic acids including carboxylic acids, ketones, aldehydes, organic nitriles, organic amines, including aromatic amines and the like, from an aqueous solution, which may have a high concentration of inorganic salts. The present process has particular applicability in water pollution control, for removing low levels (e.g. a few weight percent or less) of undesired organic contaminants and particularly polar organic contaminants from an aqueous stream, although it is not limited to such applications.

The present invention is based upon the discovery that certain oligomeric or polymeric poly(amphiphilic) compounds, especially certain poly(oxy) compounds, that are insoluble, or at most sparingly soluble, in aqueous solutions exhibit desirably high partition coefficients towards such organic solute compounds.

In fact, it is now found that there is a correlation between the organic partition coefficients in the octanol/water system and the "poly(amphiphilic) compound"/water system. That is, compounds of the present invention remove the organic compounds of interest based on the existing data base of $^K$Octanol/Water. See the following table:

| COMPOUND | $^K$Octanol/Water* | $^K$PPG-4000/Water |
|---|---|---|
| Acrylic Acid | 1.35 | 5 |
| Phenol | 28.8 | 150 |
| p-Nitrophenol | 77 | 300 |
| Toluene | 537 | 1000 |

*See "Table A-1. Water Solubility, Vapor Pressure, Henry's Law Constant, Koc, and Kow Data for Selected Chemicals" in the March 1990 Manual EPA/600/8-90/003. Therefore such partition coefficients known in the octanol/water system are useful to determine applicability of the extraction by the present process.

As used herein the term "poly(amphiphilic) compound" refers to a class of water insoluble, or at least sparingly water soluble liquid oligomers or polymers having alternating polar regions and hydrophobic regions distributed along the molecule in such a manner that the molecule has a high density of both polar and hydrophobic moieties. Such poly(amphiphilic) compounds can be prepared by oligomerizing or polymerizing moderately polar organic monomers preferably having only slight water solubility, and such poly(amphiphilic) compounds are widely available from many commercial sources.

As a general rule, the formula of suitable liquid oligomeric or polymeric poly(amphiphilic) compounds will contain a repeating unit such as:

$$[Hy-X]_n \quad \text{or} \quad \begin{matrix}[Hy]_n\\|\\X\end{matrix}$$

where Hy is a hydrophobic moiety of sufficient hydrophobicity that the oligomer or polymer is essentially insoluble in the aqueous solution to be treated. The hydrophobic moiety, Hy, is typically a hydrocarbon moiety such as a linear or branched alkylene group, preferably containing from 2 to 7 carbon atoms, for example, ethylene ($-CH_2-$)$_2$, propylene

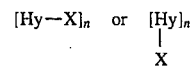

or butylene

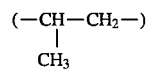

or phenylene unsubstituted or substituted by a substantially hydrocarbyl group which may be substituted with a cycloalkyl group of 4 to 8 carbon atoms or aryl, alkylaryl or arylalkyl group(s) such as phenyl, benzyl or tolyl.

X is a polar moiety that gives the poly(amphiphilic) compound a selective affinity for organic compounds, and particularly polar organic compounds, in the presence of an aqueous medium. The polar moiety, X, can be a moiety containing an ether linkage (—O—), an ester linkage

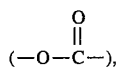

a carbonyl

a urethane linkage

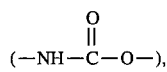

a urea

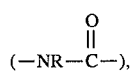

an amino $$(-N-)$$
$$\ \ \ R$$

a phosphine oxide

a nitro

sulfoxide

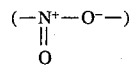

a sulfone

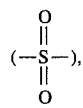

and the like. where R can be among many other possibilities a hydrogen, an alkyl of 1 to 4 carbon atoms, a cycloalkyl or an aryl group. Finally, n is a number representing the average number of repeating units (e.g., monomer units) in the oligomeric or polymeric compound of the polar and hydrophobic moieties. Typically, n is at least 3, preferably is a number somewhere between 5 and 1000, and most preferably is above about 10. An important aspect of the present invention is that the water solubility of such poly(amphiphilic) compounds is decreased by increasing the molecular weight of such compounds, i.e., by increasing the value of n, and that this is accomplished without altering the functionality of the compound. Oligomers and polymers containing a variety of alternating hydrophobic regions and polar regions are also contemplated. In other words, in addition to oligomers and polymers constituting repeating monomeric units, the functional portion of the polymer, i.e., X, can also be attached to a hydrophobic group to render the whole polymer water insoluble.

The nature of the hydrophobic and polar moieties is such that the poly(amphiphilic) compounds of the present invention are liquids under the conditions of use, the compounds are insoluble, or at most sparingly soluble in the aqueous solution with which they are in contact and the compounds exhibit a high affinity for organic compounds, particular polar organic compounds, generally of a low molecular weight, in the presence an aqueous medium. Some liquid poly(amphiphilic) compounds although useful as extractant with aqueous solutions of high ionic strengths, i.e., solutions of high salt contents, cannot be used in some applications because of their normally high water solubility. Thus, it is preferred to use liquid poly(amphiphilic) compounds that are insoluble even in pure water.

Any of a wide variety of known water-insoluble (or sparingly water soluble) oligomeric or polymeric poly(amphiphilic) compounds, especially poly(oxy) compounds, can be used in the present invention. Representative of suitable liquid oligomeric or polymeric poly(oxy) compounds are the polyalkylene oxides, including polyethylene glycols (PEGs), polybutylene glycols (PBGs), polytetramethylene glycols, polypentamethylene glycols, polyhexamethylene glycols, polyheptamethylene glycols and particularly the polypropylene glycols (PPGs). Other suitable poly(amphiphilic) compounds include polyvinylpyrrolidone (PVPs), polyesters, polyurethanes, functionalized polyolefins and the like. As a general rule, due to their low volatility such oligomeric or polymeric compounds are non-toxic and safe to handle.

While several types of liquid oligomeric and polymeric poly(amphiphilic) compounds will be effective for removing organic solutes, and particularly polar organic compounds from aqueous solutions, water insoluble or at most sparingly water soluble poly(oxy) compounds, particularly polyalklyene oxides having a molecular weight above about 400, and more usually above about 1000, such as the polyethylene glycols (PEGs), polybutylene glycols (PGBs) and especially the polypropylene glycols (PPGs) and their copolymers are particularly useful. These polyglycols are commercially available from a variety of companies, such as Dow Chemical Company and Union Carbide Corporation, and are available over a wide range of molecular weights. Copolymers of PEG and PPG made at various monomer mole ratios and having a range of molecular weights also are commercially available such as from BASF under the PLURONIC trademark and also can be used in the present invention.

As used herein, the phrases "water insoluble, "sparingly water soluble", "immiscible" and the like mean that the liquid oligomeric and polymeric compound is soluble in the aqueous solution to be treated only in an amount or to an extent of less than about 2%, normally less than about 1%, preferably about 0.01 weight percent, and more preferably at no more than about 10 ppm. As noted above, it is preferable to use poly(amphiphilic) compounds that are insoluble even in pure water, though in the broad practice of the present invention it is possible to use liquids insoluble in the aqueous solution to be treated, but not necessarily insoluble in pure water.

Since the extractant must be immiscible/insoluble in the aqueous feed solution and since solubility of these oligomeric or polymeric poly(amphiphilic) compounds decreases with increasing molecular weight, it may be necessary to use liquid oligomers and polymers having higher molecular weights. Oligomers/polymers of higher molecular weight tend to have lower solubility in the aqueous feed solution. Conversely, oligomers and polymers with lower molecular weights tend to display greater affinity for the organic solutes, have a lower viscosity and are easier to handle. Consequently, for any particular application an optimization involving the molecular weight of the oligomeric/polymeric poly(amphiphilic) compound should be undertaken to obtain best results. Generally, the molecular weight of the liquid oligomeric/polymeric compound will be above about 400, and more usually above 1000 for best results. Polypropylene glycols having a molecular weight between about 1000 and 10,000 are particularly preferred.

As noted above, the solubility of the liquid oligomeric or polymeric compound in the aqueous feed solution is influenced by solution conditions, especially solution temperature and its concentration of dissolved salts. For example, certain poly(oxy) compounds, such as the PPGs, typically exhibit a lower solubility in aqueous solutions at higher temperatures and at higher concentrations of dissolved salts. In fact, PEGs will normally be useful only with aqueous solutions of a high ionic strength (high salt concentrations) because their solubility is much too high in pure water. Thus, the anticipated condition of the aqueous feed solution also should be considered when selecting an oligomeric or polymeric extractant compound.

The oligomeric/polymeric poly(amphiphilic) extractant compound is supplied as a liquid and can be added, with mixing, directly to the aqueous solution to be treated. Generally, the aqueous solution can be contacted with as little of the liquid extractant as between about 0.1 and 50 parts by weight extractant per 100 parts by weight aqueous solution (i.e., 0.1 to 50 weight percent), although higher amounts can be used if appropriate, as well be recognized by those skilled in the art. After a suitable contacting period, which may be several seconds to several hours depending on the particular application, organic solute migrates into the extractant phase. In some cases, such as when using liquid PEGs with aqueous solutions of high ionic strength, the solute-laden extractant may actually precipitate from the aqueous feed solution. As noted above, such behavior will be influenced by the temperature and dissolved salt content of the aqueous solution and the molecular weight and type of poly(oxy) compound that is used.

Any of the wide variety of procedures and apparatus for contacting two immiscible liquid phases can be used to practice the present invention, such as mixer-settlers, packed towers, agitated towers, and in the case where the extractant remains in the liquid phase during treatment, membrane contractors. The present invention is not limited to any particular contactor type.

As recognized by those skilled in the polymer art, the viscosity and solubility of liquid oligomeric or polymeric compounds are influenced predominantly by molecular weight, which can be varied as needed to obtain those properties desired in the liquid oligomeric/polymer conducive to optimum extraction performance. Viscosity of the oligomeric/polymeric poly(amphiphilic) compound and the method of contacting to be employed are important considerations when facilitating contacting of the extractant with the aqueous solution.

For any particular application, an oligomeric or polymeric poly(amphiphilic) compound will be selected principally for its selective affinity (high partition coefficient) for the target compound(s) (solutes) desired to be removed selectively from the aqueous solution. An added advantage of using an oligomeric or polymeric compound as the extractant is that it is possible to introduce various functional groups along the polymer backbone to enhance further the polymer's selective affinity for a particular solute. In an alternative approach, it also is possible to add to the oligomeric or polymeric extractant one or more other polymers or oligomers soluble in the poly(amphiphilic) extractant but immiscible in the aqueous feed solution which enhance the affinity or selectivity of the extractant for the solute.

Polyalkylene oxides, such as the polypropylene glycols, have a strong affinity for phenolic and related compounds such as phenol, nitrophenol, nitroaniline, and the like, and are especially useful for removing such compounds from aqueous liquids. Partition coefficients for these compounds, defined as the quotient or ratio of the concentration of the target compound in the polypropylene glycol phase and its concentration in the aqueous phase under equilibrium conditions, range from about 150 to over 500 under a variety of treatment conditions. These high partition coefficients are thought to be a consequence of concomitant hydrogen bonding and hydrophobic interaction between the dissolved organic solute and particularly polar organic compounds, in the aqueous solution and the polymeric poly(oxy) compound.

The present invention is particularly useful for selectively removing low molecular weight polar organic compounds, which may be present at very low levels, such as alcohols, phenols and phenolic-derivatives, organic acids including carboxylic acids, ketones, aldehydes, esters, organic (particularly aromatic) amines, nitriles and the like, from aqueous streams, especially those containing high levels of inorganic salts. As used herein, a high level of inorganic: salt means a solution concentration above about 1–5 weight percent, more usually above about 10 weight percent and most often about 15 weight percent and higher. Such streams present a common disposal problem in industry due to the prevalent use of acid-base chemistry for organic synthesis.

Normally, the presence of salts, particularly at these higher concentrations, complicates treatment options, thus increasing disposal costs. However, the present invention provides a direct solution. In fact, the high inorganic salt concentration tends to be a benefit, rather than a detriment to the practice of the present invention. First, as noted above, high salt concentrations tend to reduce oligomer/polymer solubility in the aqueous solution. Secondly, it has been observed that partition coefficients, especially for polar organic compounds, increase with higher salt concentrations. The oligomeric/polymeric poly(amphiphilic) compounds of the present invention reject inorganic salts, and ionic species in general, including ionic organic species, very effectively, but readily absorb low molecular weight nonionized organic compounds, particularly polar organic compounds. In fact, it is believed that the combination and distribution of hydrophobic regions and polar regions in the extractant plays an important role in the high affinity and selectivity exhibited by the oligomeric/polymeric poly(amphiphilic) extractant for polar organic solutes in feed solutions containing high concentrations of dissolved salts.

Depending on the nature of the particular solute, extraction efficiency also may be influenced, and at times significantly, by the temperature and pH of the aqueous feed solution. Generally, increasing temperatures lead to lower partition coefficients. Consequently, it usually is desireable to operate the separation under conditions as close to ambient temperature as possible.

In the case of ionizable organic solutes, and particularly ionizable polar compounds, including phenolic compounds, aqueous solution pH generally has a substantial effect on the partition coefficient at any particular condition. Best results have been obtained by conducting the separation (extraction) after first adjusting the pH of the aqueous solution, as needed, to a pH of about 1 pH unit or more below the pKa of the targeted solute compound. The pKa of the solute is the pH at which the solute compound is 50% ionized in the aqueous solution. The intent is to establish a pH condition in the aqueous feed solution where the solute compound exists predominantly in a non-ionized form. In fact, it is possible to obtain a high selectivity in the removal of one ionizable organic compound from another by adjusting the pH of the aqueous solution to between the pKa's of the respective organic species. This technique is illustrated in Example 23 which follows.

Poly(amphiphilic) extractant containing the polar organic solute separated from the aqueous solution can be disposed of by incineration or alternatively can be treated to remove/recover the solute and then the poly(amphiphilic) compound can be recycled for further use. Temperature (e.g. heating) and pH control can be used to facilitate back-extraction of the solute from the spent extraction, albeit at a significantly higher concentration, into an aqueous stream.

In one useful embodiment, the aqueous solution containing the target compound(s) is circulated on one side, for example through the lumens of elongate hollow fibers supported in a housing, while the oligomeric or polymeric compound is circulated on the other side, for example over the outside of the fibers. In another embodiment, referred to in the art as a plate-and-frame configuration, at least one immobilized porous membrane is located within a liquid-tight housing and divides the interior of the housing into at least two chambers, an aqueous feed solution chamber and an extractant chamber. In both arrangements, the housing is provided with inlet and outlet ports or manifolds which permit aqueous feed solution and oligomeric/polymeric extractant liquid to be introduced and discharged.

In another useful embodiment, a gaseous stream containing the target compound(s) which itself is gaseous herein is circulated on one side, i.e., through the lumens of elongate hollow fibers supported in a housing, while the oligomeric or polymeric compound is circulated on the other side, i.e., over the outside of the fibers.

In like manner, other embodiments include processes and/or methods for removing the dissolved organic specie or species from a gaseous stream in a manner analogous to that described above for an aqueous solution.

The following examples are given as specific illustrations of the present invention, and not for the purpose of limiting the invention. Reference should be made to the appended claims to determine the invention's scope.

EXAMPLE 1

An actual aqueous waste solution (feed) containing about 4,000 mg/liter of para-nitrophenol (PNP) and 20 weight percent potassium chloride (KCl) and having a pH of about 4 was treated with a polyethylene glycol (PEG) having an average molecular weight of 5 million (Polyox Coag obtained from Union Carbide Corporation). 50 ml of the aqueous solution at a temperature of 25° C. was contacted with 0.5 gm of the PEG with stirring. A precipitate was observed to form after a few minutes of stirring. After one hour of treatment, the precipitate was filtered from the aqueous solution and the PNP concentration of the aqueous solution was determined by a spectrophotometric method. The analysis showed that about 86% of the PNP originally present in the aqueous phase had been removed with the PEG-containing precipitate.

EXAMPLE 2

The procedure of Example 1 was repeated with the exception that only 0.25 gm of the PEG was used to contact 50 ml of the aqueous solution. An analysis showed that about 60% of the PNP originally present in the aqueous phase had been removed with a PEG-containing precipitate that formed during treatment.

EXAMPLE 3

The process of Example 1 was again repeated but this time a polyethylene glycol having a molecular weight of 100,000, instead of the 5 million M.W. PEG of Example 1, was used. An analysis showed that about 83% of the PNP originally present in the aqueous phase was removed with the immiscible PEG phase.

EXAMPLE 4

The process of Example 1 was again repeated but this time using a PEG having a molecular weight of 20,000. An analysis showed that about 80% of the PNP originally present in the aqueous phase was removed with the PEG phase.

EXAMPLE 5

The process of Example 1 was repeated again but this time the pH of the aqueous solution was adjusted to 10 before contacting with the PEG. An analysis showed that only 46% of the PNP originally present in the aqueous solution was removed with the PEG phase, as contrasted with the 86% of Example 1.

EXAMPLE 6

The procedure of Example 1 was again repeated but this time the temperature of the aqueous solution was increased to 70° C. An analysis of the aqueous phase after treatment with the PEG showed that the level of PNP removal from the aqueous phase dropped to about 72%.

EXAMPLE 7

The process of Example 1 was repeated another time but in this case the PEG extractant was replaced with polyvinylpyrrolidone (PVP) having a molecular weight of 360,000. An analysis of the aqueous phase showed that 82% of the PNP originally present in the aqueous phase was removed with the PVP phase.

EXAMPLE 8

The process of Example 1 was again repeated but in this case 0.25 gm of a polypropylene glycol (PPG) having a molecular weight of 1200 and obtained from Dow Chemical Company was used as the oligomeric/polymeric poly(amphiphilic) extractant. The PPG formed a separate liquid phase from the aqueous solution. 60% of the PNP originally present in the aqueous solution was removed with the immiscible PPG phase.

EXAMPLE 9

The process of Example 8 was repeated but with 0.5 gm of the PPG being used. An analysis of the aqueous phase showed that the PNP removal level rose to 77%.

EXAMPLE 10

The process of Example 8 was repeated again but 1.0 gm of the PPG was used. An analysis showed that the level of PNP removal rose again, this time to 89%.

EXAMPLE 11

The process of Example 9 was repeated but as the oligomeric/polymeric poly(oxy) extractant a PPG having a molecular weight of 4000 was used. An analysis of the treated aqueous solution showed that 76% of the PNP was removed from the aqueous phase.

EXAMPLE 12

Example 11 was repeated but the temperature of the aqueous solution was increased to 65° C. The level of PNP removal dropped to 61%.

EXAMPLE 13

The process of Example 10 was repeated but only 10 ml (rather than 50 ml) of the aqueous (waste) solution was used. The PNP removal increased to 98.3%.

EXAMPLE 13a

The process of Example 13 (was repeated but with 0.2 g of the liquid membrane, which has a carbamate functionality) having the structure:

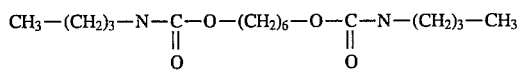

PNP removal is about 91%, corresponding to a partition coefficient of around 430.

EXAMPLE 13b

The process of example 13 was repeated but with 0.64 g Igepal® CO-210

$C_{19}H_{19}$-phenylene—O—$(CH_2$—$CH_2$—$O)_{n-1}$—$CH_2$—$CH_2$—OH (n=1.5). PNP removal was about 88%, corresponding to a partition coefficient of 110.

EXAMPLE 13c

The process of example b was repeated but with 0.57 g Igepal® CO-430

$C_{19}H_{19}$-phenylene—O—$(CH_2$—$CH_2$—$O)_{n-1}$—$CH_2$—$CH_2$—OH (n=4). PNP removal was about 95%, corresponding to a partition coefficient of 310. The higher removal efficiency and higher partition coefficient obtained with Igepal® CO-430 compared to Igepal® CO-210 reflect the fact that the functional group ($CH_2$—$CH_2$—O), whose number is three times more in Igepal® CO-430 than in Igepal® CO-210, is the one that interacts with PNP.

EXAMPLE 14

The process of Example 13 was repeated at a variety of pH and initial PNP concentrations. The separations were conducted at 23° C. The results are shown below in TABLE 1 in terms of the partition coefficients obtained at each treatment condition.

TABLE 1

| PNP, mg/L | pH | Partition Coefficient |
|---|---|---|
| 4000 | 10 | 12 |
| 4000 | 6 | 480 |
| 4000 | 5 | 640 |
| 4000 | 4 | 570 |
| 6100 | 4 | 590 |
| 800 | 4 | 570 |

EXAMPLE 15

The process of Example 13 was repeated using three different oligomeric/polymeric poly(oxy) extractant and two temperatures (23° C. and 75° C.). The results are shown below in TABLE 2.

TABLE 2

| Extractant | Temperature | Partition Coefficient |
|---|---|---|
| PPG-425 | 23° C. | 622 |
|  | 75° C. | 163 |
| PPG-1200 | 23° C. | 573 |
|  | 75° C. | 125 |
| Pluronic L31 | 23° C. | 808 |
|  | 75° C. | 153 |

EXAMPLE 16

This example describes a procedure for back-extracting PNP from a PPG phase. About 0.5 ml of the PPG phase recovered from Example 13 (containing about 37 gm PNP/liter of PPG) was mixed with 5.0 ml of a 0.1 normal aqueous sodium hydroxide (NaOH) solution. An analysis of the aqueous phase showed that about 98% of the PNP was recovered in the caustic solution.

EXAMPLE 17

An aqueous solution at a pH of about 5.5 containing about 1000 mg phenol/liter and 20 weight percent KCl was contacted with a PPG having a molecular weight of 1200. 10 ml of the aqueous solution was mixed with 1 gm of the PPG at a temperature of 23° C. An analysis of the aqueous phase showed that about 94% of the phenol was removed from the aqueous solution.

EXAMPLE 18

An aqueous solution at a pH of about 6 containing 500 mg/l of para-nitroaniline (PNA) and 20 weight percent KCl was contacted with PPG having a molecular weight of 1200. 10 ml of the aqueous solution was contacted with 1 gm of the PPG at a temperature of about 23° C. An analysis of the aqueous phase showed that about 97% of the PNA was extracted into the PPG phase.

EXAMPLE 19

In this example PNP was extracted from an aqueous solution using a membrane conductor. Ultrafiltration polysulfone hollow fibers (80% porosity, internal diameter 870 microns, outer diameter 1150 microns and having a molecular weight cutoff of 160,000) were potted into a module containing 25 fibers that were 17.5 cm long. An aqueous solution containing about 4000 mg/l PNP and 20 weight percent KCl at a pH of 5 was circulated through the lumens of the fibers. PPG MW 4000 was pumped through the shell side of the module. The system was operated at a temperature of about 60° C. After about 2 hours of operation, 90% of the PNP had been removed from the aqueous solution into the recirculating PPG.

EXAMPLE 20

An aqueous solution containing about 1000 mg/L fumaronitrile and 40 weight percent ammonium sulfate was contacted with PPG molecular weight 4000. 5 ml of the aqueous solution was mixed with 1.5 g of the PPG at a temperature of 23° C. An analysis showed that 88% of the fumaronitrile was removed from the aqueous solution.

EXAMPLE 21

An aqueous solution containing about 4000 mg/L p-nitrophenol and 20 weight percent KCl was contacted with polybutylene glycol (PBG) molecular weight 1000 obtained from Dow Chemical Company. 10 ml of the aqueous solution at a pH of 4.5 was mixed with 1.4 g of the PBG at a temperature of 23° C. An analysis showed that 97% of the p-nitrophenol was removed from the aqueous solution.

EXAMPLE 22

An aqueous solution containing about 1500 mg/L benzoic acid at a pH of 2.3 was; contacted with PPG molecular weight 4000. 10 ml of the aqueous solution was mixed with 1.3 g of the PPG at a temperature of 23° C. An analysis showed that 92% of the benzoic acid was removed from the aqueous solution.

EXAMPLE 23

The following example demonstrates the use of PPG for selective extraction of an organic compound over another in the same solution utilizing the difference in their pKas. An aqueous solution containing about 4000 mg/L p-nitrophenol (PNP, pKa=7.1) and 2000 mg/L benzoic acid (pKa=4.25) at a pH of 5.7 was contacted with PPG molecular weight 4000 at a temperature of 23° C. 5 ml of the aqueous solution was mixed with 1 g of the PPG. An analysis showed that 98% of the PNP was removed from the aqueous solution, whereas none of the benzoic acid was removed. The aqueous phase could be separated from the PPG phase, its pH adjusted to about 2, and then contacted with fresh PPG to remove the benzoic acid as shown in Example 22.

EXAMPLE 24

An aqueous solution containing about 300 mg/L benzonitrile was contacted with PPG having a molecular weight of 4000. 50 ml of the aqueous solution was mixed with 1 g of the PPG at a temperature of 23° C. An analysis showed that 67% of the benzonitrile was removed from the aqueous solution.

EXAMPLE 25

An aqueous solution containing about 1500 mg/L benzyl alcohol was contacted with a PPG having a molecular weight of 4000. 10 ml of the aqueous solution was mixed with 1 g of the PPG at a temperature of 23° C. An analysis showed that 58% of the benzyl alcohol was removed from the aqueous solution.

EXAMPLE 26

An aqueous solution containing about 4 g/l of cyclohexanone was contacted with a PPG having a molecular weight of 4000. 7 ml of the aqueous solution was mixed with 1.5 g of the PPG at a temperature of 23° C. An analysis showed that 48% of the cyclohexanone was removed from the aqueous solution.

EXAMPLE 27

An aqueous solution containing about 50 mg/l of ethyl benzoate was contacted with a PPG having a molecular weight of 4000. 10 ml of the aqueous solution was mixed with 0.3 g of the PPG at a temperature of 23° C. An analysis showed that 94% of the ethyl benzoate was removed from the aqueous solution.

The principles, preferred embodiments and modes of operation of the present invention have been described in the foregoing specification. The invention which is intended to be protected herein, however, is not to be construed was limited to the particular forms disclosed, since they are to be regarded as illustrative rather than restrictive. Variations and changes may be made by those skilled in the art without departing from the spirit of the invention.

What is claimed is:

1. A process for removing an organic compound from a gaseous stream or an aqueous solution which comprises contacting said gaseous stream or aqueous solution with a water insoluble, liquid oligomeric or polymeric poly(amphiphilic) compound having an affinity for said organic compound wherein said poly(amphiphilic) compound is a repeating unit of $$(Hy-X)_n \quad \text{or} \quad \begin{matrix} (Hy)_n \\ | \\ X \end{matrix}$$

wherein Hy is a hydrophobic moiety and X is a polor moiety and n represents the average number of repeating units.

2. A process according to claim 1 for removing an organic compound from a gaseous stream.

3. A process according to claim 1 for removing an organic compound from an aqueous stream.

4. The process of claim 1 wherein said organic compound is a polar organic compound.

5. The process of claim 1 wherein said aqueous solution contains a high concentration of dissolved inorganic salt.

6. The process of claim 1 wherein n is a number between 3 and 1000.

7. The process of claim 6 wherein the hydrophobic moiety (Hy) is a linear or branched alkylene group of 2 to 7 carbon atoms.

8. The process of claim 7 wherein said alkylene group is substituted with an aryl, a cycloalkyl, an alkylaryl or an arylalkyl group.

9. The process of claim 6 wherein the polar moiety (X) is selected from an ether linkage (—O—), an ester linkage

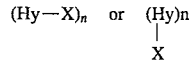

a carbonyl

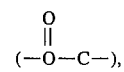

a urethane linkage

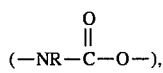

a urea linkage

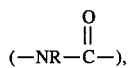

an amino (—NR—), a nitro

a sulfone

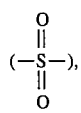

a sulfoxide

phosphine oxides

where R is a hydrogen, an alkyl group of 1 to 4 carbon atoms, a cycloalkyl or an aryl group.

10. The process of claim 6 wherein the (polyamphiphilic) compound is:

$CH_3$—$(CH_2)_3$—N—C(O)—O—$(CH_2)_6$—O—C—(O)—N—$(CH_2)_3$—$CH_3$

11. The process of claim 6 wherein the (polyamphiphilic) compound is:

$C_{19}H_{19}$-phenylenel—O—$(CH_2$—$CH_2$—$O)_{n-1}$—$CH_2$—$CH_2$—OH wherein n is 4.

12. The process of claim 6 wherein the (polyamphiphilic) compound is:

$C_{19}H_{19}$-phenylenel—O—$(CH_2$—$CH_2$—$O)_{n-1}$—$CH_2$—$CH_2$—OH wherein n is 1.5.

13. The process of claim 12 wherein said oligomeric or polymeric poly(amphiphilic) compound is selected from the group consisting of polyalkylene oxides, polyvinylpyrrolidone, polyesters, polyurethanes, and functionalized polyolefins.

14. The process of claim 13 wherein said compound is a polyalkylene oxide which has a molecular weight above about 400.

15. The process of claim 1 wherein said oligomeric or polymeric poly(amphiphilic) compound is selected from the group consisting of polyalkylene oxides, polyvinylpyrrolidone, polyesters, polyurethanes and functionalized polyolefins.

16. The process of claim 15 wherein said oligomeric or polymeric poly(amphiphilic) compound remains a liquid throughout said contacting.

17. The process of claim 15 wherein said compound is a polyalkylene which oxide has a molecular weight above about 400.

18. The process of claim 17 wherein said polyalkylene oxide is a polypropylene glycol or a polybutylene glycol having a molecular weight between 1000 and 10000.

19. The process of claim 18 wherein said oligomeric or polymeric poly(amphiphilic) compound is a polyalkylene oxide selected from the group consisting of polyethylene glycols, polypropylene glycols, polybutylene glycols and copolymers and mixtures thereof.

20. The process of claim 19 wherein said compound is a polyalkylene oxide which is a polypropylene glycol or a polybutyl glycol having a molecular weight between 1000 and 10000.

21. The process of claim 1 wherein said oligomeric or polymeric poly(amphiphilic) compound is a polyalkylene oxide selected from the group consisting of polyethylene glycols, polypropylene glycols, polybutylene glycols and copolymers and mixtures thereof.

22. The process of claim 1 wherein the oligomeric or polymeric poly(amphiphilic) compound is not a multiblock hydrophilicity-hydrophobicity tapered amphiphilic segment polyurethane which contains alkylene oxide hydrophilicity from one end of the polymer molecule to the other with a corresponding increase in hydrophobicity.

23. The process of claim 22 wherein the oligomeric or polymeric poly(amphiphilic) compound consists essentially of a hydrophobic polymer in which a repeating polar group is incorporated.

24. The process of claim 22 wherein the oligomeric or polymeric poly(amphiphilic) compound consists of alternating regions of polarity and hydrophobicity along the polymer backbone.

25. The process of claim 22 wherein the oligomeric or polymeric poly(amphiphilic) compound which is a polymerized monomer.

26. The process of claim 1 wherein the oligomeric or polymeric poly(amphiphilic) compound consists of repeating units.

27. A process of claim 1 wherein the said poly(amphiphilic) compound is essentially insoluble in the aqueous solution.

28. A process of claim 1 wherein the said poly(amphiphilic) compound is insoluble in pure water.

29. A method for selectively removing a polar organic compound from an aqueous solution containing a high concentration of dissolved inorganic salt comprising contacting said aqueous solution with a water insoluble, liquid oligomeric or polymeric poly(amphiphilic) compound having an affinity for said organic compound.

30. The method of claim 29 wherein said polar organic compound is selected from the group consisting of alcohols, phenolic compounds, organic acids, organic amines, esters, ketones, organic nitriles and aldehydes.

31. The method of claim 30 wherein said organic compound is ionizable in aqueous solution.

* * * * *